US008017695B2

(12) United States Patent
Luo et al.

(10) Patent No.: US 8,017,695 B2
(45) Date of Patent: *Sep. 13, 2011

(54) METHOD FOR PRODUCING FUNCTIONALIZED CIS-1,4-POLYDIENES HAVING HIGH CIS-1,4-LINKAGE CONTENT AND HIGH FUNCTIONALITY

(76) Inventors: Steven Luo, Copley, OH (US); Junko Kurazumi, Kodaira (JP); Yoichi Ozawa, Kodaira (JP); Timothy L. Tartamella, Silver Lake, OH (US); Mark Smale, Hudson, OH (US); Kevin McCauley, Coventry Township, OH (US)

( * ) Notice: Subject to any disclaimer, the term of this patent is extended or adjusted under 35 U.S.C. 154(b) by 388 days.

This patent is subject to a terminal disclaimer.

(21) Appl. No.: 11/964,848

(22) Filed: Dec. 27, 2007

(65) Prior Publication Data

US 2008/0182954 A1    Jul. 31, 2008

Related U.S. Application Data

(60) Provisional application No. 60/877,535, filed on Dec. 28, 2006.

(51) Int. Cl.
C08F 8/00 (2006.01)
C08F 4/52 (2006.01)
B60C 5/00 (2006.01)

(52) U.S. Cl. ............... 525/333.1; 525/105; 525/332.3; 525/332.8; 525/333.2; 525/137; 525/144; 525/153; 525/164; 525/902; 152/450

(58) Field of Classification Search ............... 526/137, 526/144, 153, 902, 164; 525/106, 332.3, 525/332.8, 333.1, 333.2, 105; 152/450
See application file for complete search history.

(56) References Cited

U.S. PATENT DOCUMENTS

| | | | |
|---|---|---|---|
| 4,906,706 A | 3/1990 | Hattori et al. | |
| 4,990,573 A | 2/1991 | Andreussi et al. | |
| 5,064,910 A | 11/1991 | Hattori et al. | |
| 5,567,784 A | 10/1996 | Wieder et al. | |
| 5,844,050 A | 12/1998 | Fukahori et al. | |
| 6,699,813 B2 | 3/2004 | Luo et al. | |
| 6,838,526 B1 | 1/2005 | Sone et al. | |
| 6,897,270 B2 | 5/2005 | Ozawa et al. | |
| 6,977,281 B1 | 12/2005 | Ozawa et al. | |
| 6,992,147 B1 | 1/2006 | Ozawa et al. | |
| 7,094,849 B2 | 8/2006 | Luo et al. | |
| 7,294,680 B2 | 11/2007 | Sone et al. | |
| 7,351,776 B2 | 4/2008 | Tartamella et al. | |
| 7,825,201 B2 * | 11/2010 | Luo et al. ............ 526/137 | |
| 2005/0197474 A1 | 9/2005 | Tartamella et al. | |
| 2006/0004131 A1 | 1/2006 | Ozawa et al. | |
| 2006/0025539 A1 | 2/2006 | Ozawa et al. | |
| 2006/0030677 A1 | 2/2006 | Ozawa et al. | |
| 2007/0149717 A1 | 6/2007 | Luo et al. | |
| 2007/0276122 A1 | 11/2007 | Luo | |
| 2008/0051552 A1 | 2/2008 | Luo et al. | |
| 2008/0146745 A1 | 6/2008 | Luo et al. | |
| 2009/0292043 A1 | 11/2009 | Kurazumi et al. | |

FOREIGN PATENT DOCUMENTS

| | | |
|---|---|---|
| EP | 0713885 A1 | 5/1996 |
| EP | 1873168 A1 | 1/2008 |
| JP | 59131609 A | 7/1984 |
| JP | 05-051406 A | 3/1993 |
| JP | 05-059103 A | 3/1993 |
| JP | 10-306113 A | 11/1998 |
| JP | 11-035633 A | 2/1999 |
| WO | WO 2006112450 A1 | 10/2006 |

OTHER PUBLICATIONS

D. J. Wilson, Journal of Polymer Science, Part A, Polymer Chemistry, 1995, vol. 33, pp. 2505-2513.
R. P. Quirk, A. M. Kells, Polymer International, 2000, vol. 49, pp. 751-756.
U.S. Appl. No. 11/890,590, Luo et al., "Process for Producing Functionalized Polymers".
European Official Communication and Extended Search Report.
European Search Report, Application No. EP 07 25 5064 dated Jun. 26, 2009.

* cited by examiner

*Primary Examiner* — Fred M Teskin
(74) *Attorney, Agent, or Firm* — Meredith E. Hooker; Arthur M. Reginelli

(57) ABSTRACT

This invention relates to a method for producing functionalized cis-1,4-polydienes having a combination of a high cis-1,4-linkage content and a high functionality, the resulting polymers and the vulcanized products containing the polymers. The functionalized cis-1,4-polydienes of the present invention are produced by a method comprising the steps of: (1) preparing a reactive polymer by polymerizing conjugated diene monomer with a lanthanide-based catalyst in the presence of less than 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound; and (2) contacting the reactive polymer with a functionalizing agent.

39 Claims, No Drawings

US 8,017,695 B2

METHOD FOR PRODUCING FUNCTIONALIZED CIS-1,4-POLYDIENES HAVING HIGH CIS-1,4-LINKAGE CONTENT AND HIGH FUNCTIONALITY

This invention claims the benefit of U.S. Provisional Patent Application Ser. No. 60/877,535, filed on Dec. 28, 2006, which is incorporated herein by reference.

FIELD OF THE INVENTION

This invention relates to methods for producing cis-1,4-polydienes having a combination of a high cis-1,4-linkage content and a high percentage of reactive polymer chains. The methods employ a particular lanthanide-based catalyst system. The polydienes can be functionalized to produce polymers having a high degree of functionality. Also, certain lanthanide-based catalyst systems can be employed to produce polymers having a narrow molecular weight distribution.

BACKGROUND OF THE INVENTION

Functionalized polymers can be prepared by anionic polymerization methods, e.g., by initiating polymerization of 1,3-butadiene with a functionalized initiator and/or by reacting a living anionic polymer with a functionalizing agent. The functionalized polymers made by anionic polymerization methods can have a high functionality, resulting in polymers that have a greater affinity toward carbon black or silica fillers than non-functionalized polymers. Therefore, the rubber vulcanizates made from the functionalized polymers give lower hysteresis loss than those made from non-functionalized polymers. Unfortunately, stereoregular polymers such as cis-1,4-polydienes, which are often required for the manufacture of certain tire components, cannot be obtained by anionic polymerization methods because these methods do not provide strict control over the polymer microstructure such as the cis-1,4-linkage content of a polydiene polymer.

Coordination catalysts (also known as Ziegler-Natta catalysts), such as lanthanide-based catalysts comprising a lanthanide compound, an alkylating agent, and a halogen-containing compound, are often highly stereoselective. These catalysts can produce conjugated diene polymers having high cis-1,4-linkage contents. The resulting cis-1,4-polydienes are particularly suitable for use in tire components such as sidewalls and treads. Nevertheless, the use of coordination catalysts in polymerization limits the ability to functionalize the resulting polymers because coordination catalysts operate by rather complex chemical mechanisms that involve the interaction among several catalyst components and often involve self-termination reactions. As a result, it is difficult to prepare highly functionalized polymers under ordinary conditions by using coordination catalysts.

Cis-1,4-polydienes that are prepared via solution polymerization processes catalyzed with lanthanide-based catalysts are known to display some degree of pseudo-living characteristics, such that some of the polymer chains possess reactive chain ends. Accordingly, these cis-1,4-polydienes may react with certain functionalizing agents, such as aminoketones, heterocumulene compounds, three-membered heterocyclic compounds, organometallic halides, and certain other halogen-containing compounds. Unfortunately, due to the above-mentioned limitations associated with a coordination catalyst, the resulting functionalized cis-1,4-polydienes generally have a lower functionality as compared to other functionalized polymers that are produced by anionic polymerization methods.

Therefore, there is a need to develop a method for producing functionalized cis-1,4-polydienes that have a combination of a high cis-1,4-linkage content and a high functionality.

BRIEF SUMMARY OF THE INVENTION

In one embodiment, the present invention provides a functionalized cis-1,4-polydiene having a cis-1,4-linkage content of greater than or equal to 95% and a functionality of greater than or equal to 75%, where the functionality is defined as the percentage of polymer chains comprising at least one functional group versus the total polymer chains in the polymer product.

In another embodiment, the present invention provides a method for preparing a reactive cis-1,4-polydiene, the method comprising the step of polymerizing conjugated diene monomer with a lanthanide-based catalyst in the presence of less than about 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound.

In another embodiment, the present invention provides a method for producing a functionalized cis-1,4-polidiene, the method comprising the steps of: (1) preparing a reactive polymer by polymerizing conjugated diene monomer with a lanthanide-based catalyst in the presence of less than 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound; and (2) contacting the reactive polymer with a functionalizing agent; wherein the resulting functionalized polymer has a cis-1,4-linkage content of greater than or equal to about 95% and a functionality of greater than or equal to about 75%, where the functionality is defined as the percentage of polymer chains comprising at least one functional group versus the total polymer chains in the polymer product.

In yet another embodiment, the present invention provides a functionalized cis-1,4-polydiene produced by a method comprising the steps of: (1) preparing a reactive polymer by polymerizing conjugated diene monomer with a lanthanide-based catalyst in the presence of less than about 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound; and (2) contacting the reactive polymer with a functionalizing agent; wherein the resulting polymer has a cis-1,4-linkage content of greater than or equal to about 95% and a functionality of greater than or equal to about 75%, where the functionality is defined as the percentage of polymer chains comprising at least one functional group versus the total polymer chains in the polymer product.

In still another embodiment, the present invention provides a vulcanizable composition comprising a functionalized cis-1,4-polydiene produced by a method comprising the steps of: (1) preparing a reactive polymer by polymerizing conjugated diene monomer with a lanthanide-based catalyst in the presence of less than about 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound; and (2) contacting the reactive polymer with a functionalizing agent; wherein the resulting polymer has a cis-1,4-linkage content of greater than or equal to about 95% and a functionality of greater than or equal to about 75%, where the functionality is defined as the percentage of polymer chains comprising at least one functional group versus the total polymer chains in the polymer product.

In a further embodiment, the present invention provides a tire made from a vulcanizable composition comprising a functionalized cis-1,4-polydiene produced by a method comprising the steps of: (1) preparing a reactive polymer by polymerizing conjugated diene monomer with a lanthanide-based catalyst in the presence of less than about 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound; and (2) contacting the reactive polymer with a functionalizing agent; wherein the resulting polymer has a cis-1,4-linkage content of greater than or equal to about 95% and a functionality of greater than or equal to about 75%, where the functionality is defined as the percentage of polymer chains comprising at least one functional group versus the total polymer chains in the polymer product.

DETAILED DESCRIPTION OF ILLUSTRATIVE EMBODIMENTS

One or more embodiments of the present invention are directed toward a method for producing cis-1,4-polydienes having an advantageously high percentage of polymer chains with reactive chain ends. These polydienes are generally produced by polymerizing conjugated diene monomer with a lanthanide-based catalyst system within a bulk polymerization system to form the reactive polymers. The lanthanide-based catalyst system includes the combination of or reaction product of (a) an lanthanide compound, (b) an aluminoxane, (c) an organoaluminum compound other than an aluminoxane, and (d) a halogen-containing compound. In one or more embodiments, where the halogen-containing compound is an iodine-containing compound, the resultant cis-1,4-polydienes advantageously have a narrow molecular weight distribution. Also, the reactive polymers can advantageously be reacted with certain functionalizing agents to form functionalized polymers having a combination of a high cis-1,4-linkage content and an unexpectedly high functionality. The resultant functionalized polymers can be used in the manufacture of tire components.

In one or more embodiments, the present inventors have unexpectedly found that functionalized cis-1,4-polydienes having a combination of a high cis-1,4-linkage content and a high functionality can be produced by a method comprising the steps of: (1) preparing a reactive polymer by polymerizing conjugated diene monomer with a lanthanide-based catalyst in the presence of less than about 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound; and (2) contacting the reactive polymer with a functionalizing agent. In one or more embodiments, other organometallic compounds, Lewis bases, and/or catalyst modifiers may be employed in addition to the ingredients (a)-(d). In one embodiment, a nickel-containing compound may be employed as a molecular weight regulator as disclosed in U.S. Pat. No. 6,699,813, which is incorporated herein by reference.

Various conjugated diene monomers or mixtures thereof can be used in the practice of the present invention. Specific examples of conjugated diene monomers include 1,3-butadiene, isoprene, 2,3-dimethyl-1,3-butadiene, 2-ethyl-1,3-butadiene, 2-methyl-1,3-pentadiene, 1,3-pentadiene, 3-methyl-1,3-pentadiene, 4-methyl-1,3-pentadiene, 1,3-hexadiene, and 2,4-hexadiene. In one or more embodiments, mixtures of two or more types of conjugated diene monomer (e.g., 1,3-butadiene and isoprene) can be employed to produce copolymers.

Various lanthanide compounds or mixtures thereof can be employed as the ingredient (a) of the catalyst system. In one embodiment, the lanthanide compounds may be soluble in hydrocarbon solvents such as aromatic hydrocarbons, aliphatic hydrocarbons, or cycloaliphatic hydrocarbons. In another embodiment, the lanthanide compounds may be insoluble in hydrocarbon solvents but can be suspended in the polymerization medium to form the catalytically active species. Further, a Lewis base such as tetrahydrofuran, acetylacetone, pyridine, or an alcohol may be employed as an aid for solubilizing the lanthanide compounds.

The lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Preferably, these compounds include neodymium, lanthanum, samarium, or didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds. Where lanthanide halides, lanthanide oxyhalides, or other lanthanide compounds containing one or more labile halogen atoms are employed, the lanthanide-containing compound can serve as both the ingredient (a) and the ingredient (d) of the catalyst system.

Suitable lanthanide compounds are described in U.S. Pat. No. 7,094,849 which is incorporated herein by reference. In one embodiment, neodymium compounds are used. In another embodiment, neodymium carboxylates are used. In still another embodiment, neodymium carboxylates such as neodymium 2-ethylhexanoate and neodymium neodecanoate (also called neodymium versatate) are used. In a further embodiment, neodymium organophosphates are used.

Various aluminoxanes or mixtures thereof can be used as the ingredient (b) of the catalyst system. Aluminoxanes include oligomeric linear aluminoxanes that can be represented by the general formula:

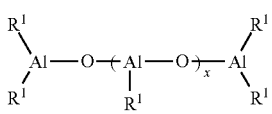

and oligomeric cyclic aluminoxanes that can be represented by the general formula:

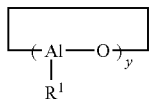

where x is an integer of 1 to about 100, preferably about 10 to about 50; y is an integer of 2 to about 100, preferably about 3 to about 20; and where each $R^1$, which may be the same or different, is a mono-valent organic group that is attached to the aluminum atom via a carbon atom. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, tin, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting one or more trihydrocarbylaluminum compounds with water. This reaction can be performed according to known methods, such as (1) a method in which the trihydrocarbylaluminum compounds are dissolved in an organic solvent and then contacted with water, (2) a method in which the trihydrocarbylaluminum compounds are reacted with water of crystallization contained in, for example, metal salts, or water adsorbed in inorganic or organic compounds, and (3) a method in which the trihydrocarbylaluminum compounds are reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, n-butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

In one embodiment, the ingredient (b) of the catalyst system is methylaluminoxane (MAO). In another embodiment, the ingredient (b) of the catalyst composition is modified methylaluminoxane (MMAO)

Various organoaluminum compounds or mixtures thereof can be used as the ingredient (c) of the catalyst system. The term "organoaluminum compounds" refers to any aluminum compound containing at least one aluminum-carbon bond. Where an organoaluminum compound containing one or more labile halogen atoms is employed, the organoaluminum compound can serve as both the ingredient (c) and ingredient (d) of the catalyst system.

Non-limiting examples of suitable organoaluminum compounds can be represented by the general formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, tin, sulfur, and phosphorus atoms.

Non-limiting examples of organoaluminum compounds represented by the general formula $AlR_nX_{3-n}$ include trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the ingredient (c) of the catalyst system is a trihydrocarbylaluminum compound. In another embodiment, the ingredient (c) of the catalyst system is a dihydrocarbylaluminum hydride compound. In still another embodiment, the ingredient (c) of the catalyst composition is a hydrocarbylaluminum dihydride compound.

Suitable trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Various halogen-containing compounds, or mixtures thereof, that contain one or more labile halogen atoms can be employed as the ingredient (d) of the catalyst system. Examples of halogen atoms include, but are not limited to, fluorine, chlorine, bromine, and iodine. A combination of two or more halogen atoms can also be utilized. In one embodiment, the halogen-containing compounds may be soluble in hydrocarbon solvents. In another embodiment, the halogen-containing compound may be insoluble in hydrocarbon solvents, but they can be suspended in the polymerization medium to form the catalytically active species.

Useful types of halogen-containing compounds include, but are not limited to, elemental halogens, mixed halogens, hydrogen halides, organic halides, inorganic halides, metallic halides, organometallic halides, and mixtures thereof. In one embodiment, the ingredient (d) of the catalyst system is an organic halide. In another embodiment, the ingredient (d) of the catalyst system is a metallic halide. In still another embodiment, the ingredient (d) of the catalyst system is an organometallic halide.

Suitable elemental halogens include fluorine, chlorine, bromine, and iodine. Suitable mixed halogens include iodine monochloride, iodine monobromide, iodine trichloride, iodine pentafluoride, iodine monofluoride, and iodine triflouride.

Suitable hydrogen halides include hydrogen fluoride, hydrogen chloride, hydrogen bromide, and hydrogen iodide.

Suitable organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, methyl bromoformate, iodomethane, diiodomethane, triiodomethane (also called iodoform), tetraiodomethane, 1-iodopropane, 2-iodopropane, 1,3-diiodopropane, t-butyl iodide, 2,2-dimethyl-1-iodopropane (also called neopentyl iodide), allyl iodide, iodobenzene, benzyl iodide, diphenylmethyl iodide, triphenylmethyl iodide, benzylidene iodide (also called benzal iodide), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

Suitable inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorus triiodide, phosphorus oxyiodide and selenium tetraiodide.

Suitable metallic halides include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide, and magnesium diiodide.

Suitable organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, and di-t-butyltin diiodide.

In one or more embodiments, iodine-containing compounds are employed as the halogen-containing compound. It has advantageously been found that the use of iodine-containing compounds within the lanthanide-based catalyst system employed herein produces polymers not only characterized by a high cis content and a high percentage of reactive polymer chains, but also advantageously produces polymers characterized by a narrow molecular weight distribution.

In yet other embodiments, a compound containing a non-coordinating anion, or a non-coordinating anion precursor, i.e., a compound that can undergo a chemical reaction to form a non-coordinating anion, may be employed in lieu of a halogen-containing compound. Compounds containing non-coordinating anions are known in the art. In general, non-coordinating anions are sterically bulky anions that do not form coordinate bonds with, for example, the active center of a catalyst system due to steric hindrance. Exemplary non-coordinating anions include tetraarylborate anions and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

In the practice of the present invention, the lanthanide-based catalyst can be employed over a wide range of catalyst concentrations and catalyst ingredient ratios. It is believed that the catalyst ingredients (a)-(d) of the lanthanide-based catalyst system may interact to form an active catalyst species. Therefore, the optimum concentration of any one catalyst ingredient may be dependent upon the concentrations of the other catalyst ingredients.

The molar ratio of the aluminoxane to the lanthanide compound (Al/Ln) can be varied from about 5:1 to about 1000:1, in another embodiment from about 10:1 to about 700:1, and in still another embodiment from about 20:1 to about 500:1, where the molar ratio refers to the moles of aluminum atoms in the aluminoxane to the moles of lanthanide atoms in the lanthanide compound.

The molar ratio of the organoaluminum compound to the lanthanide compound (Organo-Al/Ln) can be varied from about 1:1 to about 200:1, in another embodiment from about 2:1 to about 100:1, and in yet another embodiment from about 5:1 to about 50:1.

The molar ratio of the halogen-containing compound to the lanthanide compound (halogen/Ln) is best described as the ratio of the moles of halogen atoms in the halogen-containing compound to the moles of lanthanide atoms in the lanthanide compound. The halogen/Ln molar ratio can be varied from about 0.5:1 to about 20:1, in another embodiment from about 1:1 to about 10:1, and in still another embodiment from about 2:1 to about 6:1.

In those embodiments employing a non-coordinating anion or anion precursor, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

The lanthanide-based catalyst can be formed by combining or mixing the catalyst ingredients (a), (b), (c), and (d). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition can be formed by using one of the following methods:

In one embodiment, the catalyst composition may be formed in situ by separately adding the four catalyst ingredients to the monomer to be polymerized in either a stepwise or simultaneous manner.

In another embodiment, the catalyst composition may be preformed. That is, the four catalyst ingredients are pre-mixed outside the polymerization system either in the absence of monomer or, preferably, in the presence of a small amount of at least one conjugated diene monomer at an appropriate temperature, which is generally from about −20° C. to about 80° C. Specific examples of conjugated diene monomers have been set forth above. The conjugated diene monomer used for preforming the catalyst can be the same as or different from the monomer to be polymerized. The amount of conjugated diene monomer used for preforming the catalyst can range from about 1 to about 500 moles, more preferably from about 5 to about 250 moles, and even more preferably from about 10 to about 100 moles per mole of the lanthanide compound. The resulting preformed catalyst composition can be aged, if desired, prior to being added to the monomer that is to be polymerized.

In yet another embodiment, the catalyst composition may be formed by using a two-stage procedure. The first stage involves reacting the lanthanide compound with the aluminoxane and the organoaluminum compound either in the absence of any conjugated diene monomer or, preferably, in the presence of a small amount of at least one conjugated diene monomer at an appropriate temperature, which is generally from about −20° C. to about 80° C. The amount of conjugated diene monomer used in this first stage is generally the same as that amount used for preforming the catalyst as described in the previous paragraph. In the second stage, the mixture prepared in the first stage and the halogen-containing compound are charged in either a stepwise or simultaneous manner to the monomer that is to be polymerized.

The lanthanide-based catalyst exhibits high activity for polymerizing conjugated dienes. Although one preferred embodiment of this invention is directed toward the polymerization of 1,3-butadiene into cis-1,4-polybutadiene, the process of this invention can also be utilized for the polymerization of other conjugated dienes into cis-1,4-polydienes. Further, the process of this invention can also be utilized for the copolymerization of two or more conjugated dienes into copolymers having a cis-1,4 microstructure. Specific examples of conjugated dienes have been set forth above.

The polymerization of conjugated dienes according to this invention is conducted in the presence of a catalytically effective amount of the lanthanide catalyst composition. The introduction of the catalyst composition, the conjugated diene monomer, and any solvent (if employed) forms a polymerization mixture in which the polymer product is formed. The polymer product may be referred to as a reactive polymer or a pseudo-living polymer. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. Generally, the amount of the lanthanide compound used can be varied from about 0.001 to about 1 mmol, in other embodiments from about 0.005 to about 0.5 mmol, and in other embodiments from about 0.01 to about 0.2 mmol per 100 g of conjugated diene monomer.

The polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The term organic solvent or diluent is used herein conventionally; that is, it refers to organic compounds that will not polymerize or enter into the structure of the polymer to be produced. Typically, these organic solvents are inert to the catalyst composition used to catalyzed the polymerization. Exemplary organic solvents are hydrocarbons having a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used. For environmental reasons, aliphatic and cycloaliphatic hydrocarbons are highly preferred. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and may remain incorporated in the polymer. The performance characteristics of the polymer are generally not affected appreciably when the content of high molecular weight hydrocarbons is less than about 5% by weight of the polymer.

In one embodiment, a small quantity of an organic solvent, which can be either low-boiling or high-boiling, may be employed as a carrier to either dissolve or suspend the catalyst ingredients in order to facilitate the delivery of the catalyst ingredients to the polymerization system. In another embodiment, conjugated diene monomer can be used as the catalyst carrier. In yet another embodiment, the catalyst ingredients can be used in their neat state without any solvent.

The polymerization can be conducted in a conventional stirred-tank reactor if the conversion is to be limited to a level of less than about 50% to about 60%. If a higher conversion is desired, then because of the presence of a highly viscous cement, it is preferable to employ an elongated reactor in which the cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Publ. No. 2005/0197474A1, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted. For example, and as is known in the art, it may be advantageous to combine certain catalyst ingredients in the absence or presence of monomer and allow them to age before initiating polymerization. Techniques of this type are disclosed in U.S. Pat. Nos. 6,699,813, 6,897,270, and 7,094,849, which are incorporated herein by reference.

The polymerization can be carried out as a batch process, a continuous process, or a semi-continuous process. In the semi-continuous process, the monomer is intermittently charged as needed to replace that monomer already polymerized. In any case, the polymerization is preferably conducted under anaerobic conditions. The polymerization temperature may be varied. However, due to the limited solubility of cis-1,4-polybutadiene in 1,3-butadiene monomer at elevated temperatures, it is preferable to employ a relatively low polymerization temperature in order to maintain the polymerization mass in a single-phase homogeneous system, which allows the polymer molecular weight to be rigorously controlled and gives a uniform polymer product. Thus, the polymerization temperature is preferably in a range of from about 0° C. to about 50° C., more preferably from about 5° C. to about 45° C., and even more preferably from about 10° C. to about 40° C. The heat of polymerization may be removed by external cooling with a thermally controlled reactor jacket, internal cooling by evaporation and condensation of the monomer through the use of a reflux condenser connected to the reactor, or a combination of the two methods. The pressures at which the polymerization is carried out are preferably those that ensure that the majority of the monomer is in the liquid phase.

The polymerization can be carried out to any desired conversions before the polymerization is terminated. However, it is preferable to avoid the high cement viscosity resulting from high conversions, as well as the possible separation of polymer as a solid phase from the monomer at high conversions due to the limited solubility of, for example, cis-1,4-polybutadiene, in monomer. Accordingly, in one embodiment, the conversion is in the range of from about 5% to about 60%. In another embodiment, the conversion is from about 10% to about 40%. In still another embodiment, the conversion is from about 15% to about 30%. The unreacted monomer can later be recycled back to the process.

Advantageously, the cis-1,4-polydienes produced by the polymerization process of this invention possess an enhanced degree of pseudo-living characteristics, such that a greater percentage of polymer chains in these polymers have reactive chain ends as compared to the polymers produced by conventional polymerization methods, where the percentage refers to the number of polymer chains having reactive chain ends versus the total number of polymer chains. In one or more embodiments, the percentage of polymer chains having reactive chain ends is at least 75%, in other embodiments at least 80%, in other embodiments at least 85%, in other embodiments at least 90%, and in other embodiments at least 95%. This increased percentage of polymer chains having reactive chain ends allows for the introduction of a higher functionality into the polymers.

Once a desired monomer conversion is achieved, a functionalizing agent may be introduced into the polymerization mixture to react with any reactive polymer chains so as to give a functionalized polymer. In one or more embodiments, the functionalizing agent is introduced prior to contacting the polymerization mixture with a quenching agent or antioxidant. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875,484, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent may be in a range of from about 1 to about 200 moles, in other embodiments from about 5 to about 150 moles, and in other embodiments from about 10 to about 100 moles per mole of the lanthanide compound.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in co-pending U.S. Ser. No. 11/890,590, filed on Aug. 7, 2007, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Subsequent to the functionalization reaction, a quenching agent can be added to the polymerization mixture in order to inactivate any residual reactive polymer chains and the catalyst or catalyst components. The quenching agent may be a protic compound, which includes, but is not limited to, an alcohol, a carboxylic acid, an inorganic acid, water, or a mixture thereof. In particular embodiments, the quenching agent includes a polyhydroxy compound as disclosed in copending U.S. Ser. No. 11/890,591, filed on Aug. 7, 2007, which is incorporated herein by reference. An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture.

When the polymerization mixture has been quenched, the functionalized cis-1,4-polydiene can be recovered from the polymerization mixture by using any conventional procedures of desolventization and drying that are known in the art. For instance, the polymer can be most conveniently recovered by passing the polymer cement through an adjacent heated screw apparatus (desolventizing extruder), in which the volatile substances are removed by evaporation at temperatures in the range of about 100° C. to about 170° C. and atmospheric or subatmospheric pressure. This treatment serves to remove the unreacted monomer, the low-boiling solvent introduced with the catalyst, as well as the quenching agent such as water that is introduced in excess of that required for the deactivation of the catalyst. Alternatively, the polymer can also be recovered by subjecting the polymer cement to steam desolventization, followed by drying the resulting polymer crumbs in a hot air tunnel. In any case, the unreacted monomer is isolated and recycled back to the process. In one embodiment, the content of the volatile substances in the dried polymer is below about 1%, and in another embodiment this content is below about 0.5%.

Advantageously, the polymers produced according to one or more embodiments of this invention exhibit a higher cis-1,4-linkage content than can be achieved by conventional polymerization methods. In one embodiment, the polymers have a cis-1,4-linkage content of about 95% or higher. In another embodiment, the polymers have a cis-1,4-linkage content of about 98% or higher. In still another embodiment, the polymers have a cis-1,4-linkage content of about 99% or higher.

The polymers produced according to one or more embodiments of this invention also exhibit a higher functionality than can be achieved by conventional polymerization methods. The functionality is calculated from the number of polymer chains containing a functional group versus the total number of polymer chains in the polymer product. In one embodiment, the polymers have a functionality of about 75% or higher. In another embodiment, the polymer have a functionality of about 80% or higher. In a further embodiment, the polymers have a functionality of about 85% or higher. In other embodiments, the polymers have a functionality of at least 90%, or in other embodiments at least 95%.

Due to their higher functionality, the polymers produced according to this invention show a greater affinity toward carbon black or silica fillers than polymers produced by conventional polymerization methods. Accordingly, they provide better tensile properties, higher abrasion resistance, lower hysteresis loss, and outstanding fatigue resistance in rubber compounds.

The polymer produced according to one or more embodiments of this invention, particularly those embodiments employing an iodine-containing compound within the catalyst system, further exhibit a narrower molecular weight distribution than can be achieved using other catalyst systems in bulk or solution polymerization systems. The molecular weight distribution is determined by the weight average molecular weight ($M_w$) divided by the number average molecular weight ($M_n$). $M_w$ and $M_n$ can be determined by using conventional GPC analysis calibrated with polystyrene standards and Mark-Houwink constants for the polymer in question. In one embodiment, the polymer product has a molecular weight distribution of less than 1.8, in other embodiments less than 1.6, in other embodiments less than 1.5, in other embodiments less than 1.4, and in other embodiments less than 1.3.

The above-mentioned characteristics of the polymers produced according to this invention make them advantageous for a number of uses. For example, the functionalized cis-1,4-polybutadiene is particularly useful in the manufacture of various tire components including, but not limited to, tire treads, sidewalls, subtreads, and bead fillers. The functionalized cis-1,4-polybutadiene can be used as all or part of the elastomeric component of a tire stock or rubber composition useful for making a tire or component thereof. When the functionalized cis-1,4-polybutadiene is used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with a low cis-1,4-linkage content, poly(styrene-co-butadiene-co-isoprene), and mixtures thereof. The functionalized cis-1,4-polybutadiene can also be used in the manufacture of hoses, belts, shoe soles, window seals, and other industrial products.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. In particular embodiments, the functional polymers are employed in tread and sidewall formulations. In one or more embodiments, these tread formulations may include from about 10% to about 100% by weight, in other embodiments from about 35% to about 90% by weight, and in other embodiments from about 50% to 80% by weight of the functionalized polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. Optionally, additional mixing stages, sometimes called remills, can be employed between the masterbatch mixing stage and the final mixing stage. Various ingredients including the functionalized polymer of this invention can be added during these remills. Rubber compounding techniques and the additives employed therein are generally known as disclosed in *The Compounding and Vulcanization of Rubber*, in *Rubber Technology* ($2^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

In the following examples, the Mooney viscosities ($ML_{1+4}$) of the polymer samples were determined at 100° C. by using a Monsanto Mooney viscometer with a large rotor, a one-minute warm-up time, and a four-minute running time. The number average ($M_n$) and weight average (Me) molecular weights and molecular weight distributions ($M_w/M_n$) of the polymer samples were determined by gel permeation chromatography (GPC) calibrated with polystyrene standards and Mark-Houwink constants for the polymers in question. The GPC instrument was equipped with a differential refractive index (RI) detector and an ultraviolet (UV) absorption detector. The GPC UV/RI ratio, which is the ratio of the UV detector signal to the RI detector signal, was used to calculate the % functionality of the polymer samples by referencing the GPC UV/RI ratio of the functionalized cis-1,4-polybutadiene to the UV/RI ratio of a functionalized polybutadiene sample that is produced by using anionic polymerization and has the same $M_n$. The cis-1,4-linkage, trans-1,4-linkage, and 1,2-linkage contents of the polymer samples were determined by Infrared spectroscopy.

Example 1

In this experiment, a functionalized cis-1,4-polybutadiene was prepared by polymerizing 1,3-butadiene monomer in bulk with a catalyst system comprising neodymium versatate (hereinafter NdV), methylaluminoxane (hereinafter MAO), diisobutylaluminum hydride (hereinafter DIBAH), and diethylaluminum chloride (hereinafter DEAC), followed by treating the resultant reactive polymer with 4,4'-bis(diethylamino)benzophenone (hereinafter DEAB).

The polymerization reactor was a one-gallon stainless-steel reactor equipped with a mechanical agitator (shaft and blades) capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket containing cold water. The heat of polymerization was dissipated partly by internal cooling through the use of the reflux condenser system, and partly by external cooling through heat transfer to the cooling jacket.

The reactor was thoroughly purged with a stream of dry nitrogen, which was then replaced with 1,3-butadiene vapor by charging 65 g of dry 1,3-butadiene monomer to the reactor, heating the reactor to 65° C., and then venting the 1,3-butadiene vapor from the top of the reflux condenser system until no liquid 1,3-butadiene remained in the reactor. Cooling water was applied to the reflux condenser and the reactor jacket, and 1302 g of 1,3-butadiene monomer was charged into the reactor. After the monomer was thermostated at about 13° C., the polymerization was initiated by charging into the reactor a preformed catalyst that had been prepared by mixing 1.81 mL of 4.32 M MAO in toluene, 0.58 mL of 20.6 wt % 1,3-butadiene in hexane, 0.83 mL of 0.0944 M NdV in hexane, 3.12 mL of 1.0 M DIBAH in hexane, and 0.31 mL of 1.0 M DEAC in hexane and allowing the mixture to age for 15 minutes. After 1.2 minutes from the commencement of the polymerization, 6.40 mL of 1.22 M DEAB in toluene was added to the polymerization mixture and stirred for 8 minute. The polymerization mixture was then quenched by the addition of 1.7 mL of isopropanol in 1360 g of hexane. The resulting polymer cement was coagulated with 3 gallons of isopropanol containing 5 g of 2,6-di-t-butyl-4-methylphenol and then dried on a drum dryer to give 81.4 g of DEAB-functionalized cis-1,4-polybutadiene. The properties of the polymer are summarized in Table I.

TABLE I

| | Example No. | | | | |
|---|---|---|---|---|---|
| | 1 | 2 | 3 | 4 | 5 |
| $ML_{1+4}$ | 39.4 | 41.1 | 35.5 | 38.6 | 37.0 |
| $M_n$ (kg/mol) | 115.6 | 126.8 | 150.2 | 135.5 | 124.9 |

TABLE I-continued

| | Example No. | | | | |
|---|---|---|---|---|---|
| | 1 | 2 | 3 | 4 | 5 |
| $M_w$ (kg/mol) | 351.8 | 347.4 | 337.9 | 347.5 | 226.3 |
| $M_w/M_n$ | 3.04 | 2.74 | 2.25 | 2.56 | 1.81 |
| UV/RI ratio | 1.24 | 1.10 | 0.53 | 0.58 | 0.81 |
| DEAB Functionality (%) | 99.4 | 96.9 | 52.5 | 51.8 | 61.7 |
| % cis-1,4 | 99.36 | 99.33 | 98.62 | 98.91 | 94.95 |
| % trans-1,4 | 0.43 | 0.45 | 1.15 | 0.85 | 4.56 |
| % 1,2 | 0.21 | 0.22 | 0.23 | 0.24 | 0.49 |

Example 2

In Example 2, a DEAB-functionalized cis-1,4-polybutadiene was prepared by polymerizing 1,3-butadiene monomer in bulk with the same procedure and the same catalyst system as used in Example 1 except that DEAB was added after 1.5 minutes from the commencement of the polymerization. The yield of the polymer was 111.6 g. The properties of the resulting polymer are summarized in Table I.

Example 3

Comparative Example

In this experiment, a DEAB-functionalized cis-1,4-polybutadiene was prepared by polymerizing 1,3-butadiene monomer in bulk with a catalyst system comprising neodymium versatate (NdV), triisobutylaluminum (TIBA), and diethylaluminum chloride (DEAC), followed by treating the resultant reactive polymer with DEAB.

The same reactor and the same reactor preparation procedure as used in Example 1 were employed. After 1302 g of 1,3-butadiene monomer was charged into the reactor and the monomer was thermostated at 13° C., 29.1 mL of 0.68 M TIBA in hexane was charged into the reactor, followed by the addition of 4.58 mL of 0.054 M NdV. After the mixture inside the reactor was aged for 15 minutes, the polymerization was initiated by charging 5.30 mL of 0.14 M DEAC in hexane into the reactor. After 76 minutes from the commencement of the polymerization, 10.1 mL of 1.22 M DEAB in toluene was added to the polymerization mixture and stirred for 8 minute. The polymerization mixture was then quenched by the addition of 4.56 mL of isopropanol in 1360 g of hexane. The resulting polymer cement was coagulated with 3 gallons of isopropanol containing 5 g of 2,6-di-t-butyl-4-methylphenol and then dried on a drum dryer to give 248.9 g of DEAB-functionalized cis-1,4-polybutadiene. The properties of the resulting polymer are summarized in Table I.

Example 4

Comparative Example

In this experiment, a DEAB-functionalized cis-1,4-polybutadiene was prepared by polymerizing 1,3-butadiene monomer in bulk with a catalyst system comprising neodymium versatate (NdV), triisobutylaluminum (TIBA), diisobutylaluminum hydride (DIBAH) and diethylaluminum chloride (DEAC), followed by treating the resultant reactive polymer with DEAB.

The same reactor and the same reactor preparation procedure as used in Example 1 were employed. After 1302 g of 1,3-butadiene monomer was charged into the reactor and the monomer was thermostated at 13° C., 10.91 mL of 0.68 M TIBA in hexane and 2.47 mL of 1.0 M DIBAH in hexane were charged into the reactor, followed by the addition of 4.58 mL of 0.054 M NdV. After the mixture inside the reactor was aged for 15 minutes, the polymerization was initiated by charging 5.30 mL of 0.14 M DEAC in hexane into the reactor. After 80 minutes from the commencement of the polymerization, 10.1 mL of 1.22 M DEAB in toluene was added to the polymerization mixture and stirred for 8 minutes. The polymerization mixture was then quenched by the addition of 2.40 mL of isopropanol in 1360 g of hexane. The resulting polymer cement was coagulated with 3 gallons of isopropanol containing 5 g of 2,6-di-t-butyl-4-methylphenol and then dried on a drum dryer to give 180.2 g of DEAB-functionalized cis-1,4-polybutadiene. The properties of the resulting polymer are summarized in Table I.

A comparison of the results obtained in Examples 1 and 2 with those obtained in Examples 3 and 4 (comparative examples) indicates that bulk polymerization of 1,3-butadiene with the catalyst system comprising NdV, MAO, DIBAH, and DEAC provides DEAB-modified cis-1,4-polybutadiene having a higher cis-1,4-linkage content and a higher functionality than can be achieved by bulk polymerization of 1,3-butadiene with other catalyst systems.

Example 5

Comparative Example

In Example 5, a DEAB-functionalized cis-1,4-polybutadiene was prepared by polymerizing 1,3-butadiene monomer in solution with the same catalyst system as used in Examples 1 and 2, followed by treating the resultant reactive polymer with DEAB.

To a 2-gallon stainless-steel reactor equipped with turbine agitator blades was added 1592 g of hexane and 2873 g of 22.1 wt % butadiene in hexane. The polymerization was initiated by charging into the reactor a preformed catalyst that had been prepared by mixing 6.98 mL of 4.32 M MAO in toluene, 1.47 g of 22.1 wt % 1,3-butadiene in hexane, 0.56 mL of 0.537 M NdV in cyclohexane, 6.33 mL of 1.0 M DIBAH in hexane, and 1.21 mL of 1.0 M DEAC in hexane and allowing the mixture to age for 15 minutes. The reactor jacket temperature was then set to 65° C. Sixty five minutes after addition of the catalyst, the polymerization mixture was cooled to room temperature. 429 g of the resulting reactive polymer cement was transferred to a nitrogen-purged bottle, followed by addition of 3.41 mL of 0.502 M DEAB in toluene. The bottle was tumbled for 30 minutes in a water bath maintained at 65° C. The resulting mixture was coagulated with 3 liters of isopropanol containing 0.5 g of 2,6-di-t-butyl-4-methylphenol and then dried on a drum dryer to give 54.9 g of DEAB-modified cis-1,4-polybutadiene. The properties of the resulting polymer are summarized in Table I.

A comparison of the results obtained in Examples 1 and 2 with those obtained in Example 5 (comparative example) indicates that bulk polymerization of 1,3-butadiene with the catalyst system comprising NdV, MAO, DIBAH, and DEAC provides DEAB-modified cis-1,4-polybutadiene having a higher cis-1,4-linkage content and a higher functionality than can be achieved by solution polymerization of 1,3-butadiene with the same catalyst system.

Example 6

In this experiment, cis-1,4-polybutadiene was prepared by polymerizing 1,3-butadiene monomer in bulk with a catalyst system comprising neodymium NdV, MAO, DIBAH, and trimethylsilyl iodide (TMSI). The same reactor and the same procedure as used in Example 1 were employed. After 1302 g of 1,3-butadiene monomer was charged into the reactor and the monomer was thermostated at 10° C., the polymerization was initiated by charging into the reactor a preformed catalyst that had been prepared by mixing 6.5 mL of 19.2 wt % 1,3-butadiene in hexane, 1.44 mL of 0.054 M NdV in hexane, 5.20 mL of 1.50 M MAO in toluene, 2.50 mL of 1.0 M DIBAH in hexane, and 3.12 mL of 0.050 M TMSI in hexane and allowing the mixture to age for 15 minutes. After 5 minutes from its commencement, the polymerization was terminated by the addition of 4.6 mL of isopropanol in 1360 g of hexane. The resulting polymer cement was coagulated with 3 gallons of isopropanol containing 5 g of 2,6-di-t-butyl-4-methylphenol and then dried on a drum dryer. The yield of the polymer was 161.4 g. The properties of the resulting polymer are summarized in Table II.

TABLE II

| | Example No. | | | | | |
|---|---|---|---|---|---|---|
| | 6 | 7 | 8 | 9 | 10 | 11 |
| $ML_{1+4}$ | 26.2 | 26.4 | 18.6 | 51.1 | 52.5 | 56.2 |
| $M_n$ (kg/mol) | 171.7 | 153.3 | 136.7 | 188.2 | 140.1 | 194.2 |
| $M_w$ (kg/mol) | 228.4 | 253.7 | 222.0 | 259.4 | 402.9 | 265.8 |
| $M_w/M_n$ | 1.33 | 1.65 | 1.62 | 1.38 | 2.88 | 1.37 |
| % cis-1,4 | 98.98 | 98.72 | 98.57 | 98.99 | 99.42 | 98.70 |
| % trans-1,4 | 0.83 | 1.11 | 1.23 | 0.83 | 0.41 | 1.00 |
| % 1,2 | 0.19 | 0.17 | 0.20 | 0.18 | 0.18 | 0.30 |

Example 7

Comparative Example

The same procedure as used in Example 6 was used except that trimethylsilyl bromide (TMSBr) was used instead of TMSI. After 2.3 minutes from its commencement, the polymerization was terminated by the addition of 4.6 mL of isopropanol in 1360 g of hexane, and the resulting polymer cement was coagulated with 3 gallons of isopropanol containing 5 g of 2,6-di-t-butyl-4-methylphenol and then dried on a drum dryer. The yield of the polymer was 159.1 g. The properties of the resulting polymer are summarized in Table II.

Example 8

Comparative Example

The same procedure as used in Example 6 was used except that trimethylsilyl chloride (TMSCl) was used instead of TMSI. After 2.50 minutes from its commencement, the polymerization was terminated by the addition of 4.6 mL of isopropanol in 1360 g of hexane, and the resulting polymer cement was coagulated with 3 gallons of isopropanol containing 5 g of 2,6-di-t-butyl-4-methylphenol and then dried on a drum dryer. The properties of the resulting polymer are summarized in Table II.

A comparison of the results obtained in Example 6 with those obtained in Examples 7 and 8 (comparative examples) indicates that the use of TMSI instead of TMSBr or TMSCl results in the formation of cis-1,4-polybutadiene having narrower molecular weight distribution and higher cis-1,4-linkage content. In addition, it was observed that bulk polymerization experiments conducted with the catalysts comprising TMSBr or TMSCl resulted in more viscous polymer cement viscosities due to the broader molecular weight distribution of the resulting polymer, and therefore the reactor was fouled relatively easily due to the accumulation of insoluble polymer material onto the wall of the reactor and onto the shaft and blades of the agitator. In contrast, bulk polymerization experiments conducted with the catalyst comprising TMSI yielded less viscous polymer cement viscosities due to the narrower molecular weight distribution of the resulting polymer, and therefore the reactor fouling was minimal.

Example 9

The same procedure as used in Example 6 was used except that diethylaluminum iodide (DEAI) was used instead of TMSI. After 1302 g of 1,3-butadiene monomer was charged into the reactor and the monomer was thermostated at 10° C., the polymerization was initiated by charging into the reactor a preformed catalyst that had been prepared by mixing 6.5 g of 20.6 wt % 1,3-butadiene in hexane, 1.44 mL of 0.054 M NdV in hexane, 5.20 mL of 1.5 M MAO in toluene, 2.26 mL of 1.0 M DIBAH in hexane, and 3.12 mL of 0.05 M DEAI in hexane and allowing the mixture to age for 15 minutes. After 10.5 minutes from its commencement, the polymerization was terminated by the addition of 4.6 mL of isopropanol in 1360 g of hexane. The resulting polymer cement was coagulated with 3 gallons of isopropanol containing 5 g of 2,6-di-t-butyl-4-methylphenol and then dried on a drum dryer. The yield of the polymer was 167.1 g. The properties of the resulting polymer are summarized in Table II.

Example 10

Comparative Example

The same procedure as used in Example 9 was used except that DEAC was used instead of DEAI. After 1302 g of 1,3-butadiene monomer was charged into the reactor and the monomer was thermostated at 10° C., the polymerization was initiated by charging into the reactor a preformed catalyst that had been prepared by mixing 6.5 g of 20.6 wt % 1,3-butadiene in hexane, 1.44 mL of 0.054 M NdV in hexane, 5.20 mL of 1.5 M MAO in toluene, 3.11 mL of 1.0 M DIBAH in hexane, and 0.31 mL of 1.0 M DEAC in hexane and allowing the mixture to age for 15 minutes. After 3.6 minutes from its commencement, the polymerization was terminated by the addition of 1.7 mL of isopropanol in 1360 g of hexane. The resulting polymer cement was coagulated with 3 gallons of isopropanol containing 5 g of 2,6-di-t-butyl-4-methylphenol and then dried on a drum dryer. The properties of the resulting polymer are summarized in Table II.

A comparison of the results obtained in Example 9 with those obtained in Example 10 (comparative example) indicates that the use of DEAI instead of DEAC results in the formation of cis-1,4-polybutadiene having narrower molecular weight distribution.

In addition, it was generally observed that bulk polymerization experiments conducted with the catalysts comprising a bromine- or chlorine-containing compound resulted in more viscous polymer cement due to the broader molecular weight distribution of the resulting polymer, and therefore the reactor was fouled relatively easily due to the accumulation of insoluble polymer material onto the wall of the reactor and onto the shaft and blades of the agitator. In contrast, bulk polymerization experiments conducted with the catalysts comprising an iodine-containing compound yielded less viscous polymer cement due to the narrower molecular weight distribution of the resulting polymer, and therefore the reactor fouling was reduced.

Example 11

The same procedure as used in Example 9 was used except that the polymerization was conducted at a higher temperature of 32° C. After 1302 g of 1,3-butadiene monomer was charged into the reactor and the monomer was thermostated at 32° C., the polymerization was initiated by charging into the reactor a preformed catalyst that had been prepared by mixing 6.5 g of 19.2 wt % 1,3-butadiene in hexane, 1.44 mL of 0.054 M NdV in hexane, 5.20 mL of 1.5 M MAO in toluene, and 1.95 mL of 1.0 M DIBAH in hexane and 3.12 mL of 0.05 M DEAI in hexane and allowing the mixture to age for 15 minutes. After 3.6 minutes from its commencement, the polymerization was terminated by the addition of 1.7 mL of isopropanol in 1360 g of hexane. The resulting polymer cement was coagulated with 3 gallons of isopropanol containing 5 g of 2,6-di-t-butyl-4-methylphenol and then dried on a drum dryer. The yield of the polymer was 164.0 g. The properties of the resulting polymer are summarized in Table II.

Example 12

Comparative Example

The same procedure as used in Example 11 was used except that DEAC was used instead of DEAI. After 1302 g of 1,3-butadiene monomer was charged into the reactor and the monomer was thermostated at 32° C., the polymerization was initiated by charging into the reactor a preformed catalyst that had been prepared by mixing 6.5 g of 20.6 wt % 1,3-butadiene in hexane, 1.44 mL of 0.054 M NdV in hexane, 5.20 mL of 1.5 M MAO in toluene, 3.11 mL of 1.0 M DIBAH in hexane, and 0.31 mL of 1.0 M DEAC in hexane and allowing the mixture to age for 15 minutes. The polymerization reaction was found to be excessively fast, and the temperature rose rapidly. In less than two minutes, the reactor was fouled with insoluble gelled polymer. At this point, in order to avoid a runaway reaction, the polymerization was terminated by the addition of 1.7 mL of isopropanol dissolved in 1360 g of hexane. After the polymerization mixture was discharged from the reactor, visual inspection of the interior of the reactor revealed that severe reactor fouling had occurred. Specifically, the wall of the reactor as well as the shaft and blades of the agitator were coated with insoluble gelled polymer lumps. Due to the fouling, the reactor had to be opened for cleaning.

A comparison of the results obtained in Example 11 with those obtained in Example 12 (comparative example) indicates that the use of DEAI instead of DEAC reduces the risk of a runaway polymerization reaction.

Various modifications and alterations that do not depart from the scope and spirit of the invention will become apparent to those skilled in the art. This invention is not duly limited to the illustrative embodiments set forth herein.

What is claimed is:
1. A functionalized cis-1,4-polydiene having a cis-1,4-linkage content of greater than or equal to about 98%, a molecular weight distribution of less than 1.8, and a functionality of greater than or equal to about 80%, where the functionality is defined as the percentage of polymer chains comprising at least one functional group versus the total polymer chains in a polymer product.

2. The functionalized cis-1,4-polydiene of claim 1, wherein the functionalized cis-1,4-polydiene is functionalized cis-1,4-polybutadiene.

3. The functionalized cis-1,4-polydiene of claim 1, wherein the functionalized cis-1,4-polydiene is functionalized cis-1,4-polyisoprene.

4. The functionalized cis-1,4-polydiene of claim 1, wherein the functionalized cis-1,4-polydiene is functionalized cis-1,4-poly(butadiene-co-isoprene).

5. The functionalized cis-1,4-polydiene of claim 1, where the polymer product has a molecular weight distribution of less than 1.5.

6. The functionalized cis-1,4-polydiene of claim 5, where the polymer product has a molecular weight distribution of less than 1.4.

7. A method for producing a functionalized cis-1,4-polydiene, the method comprising the steps of:
  (1) preparing a reactive polymer by polymerizing conjugated diene monomer with a lanthanide-based catalyst in the presence of less than about 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound wherein the molar ratio of the halogen-containing compound to the lanthanide compound is from about 0.5:1 to 6:1; and
  (2) contacting the reactive polymer with a functionalizing agent; wherein the resulting functionalized polymer has a cis-1,4-linkage content of greater than or equal to about 98% and a functionality of greater than or equal to about 80%, where the functionality is defined as the percentage of polymer chains comprising at least one functional group versus the total polymer chains in a polymer product.

8. The method of claim 7, wherein the conjugated diene monomer is 1,3-butadiene.

9. The method of claim 7, wherein the conjugated diene monomer is isoprene.

10. The method of claim 7, wherein the conjugated diene monomer is a mixture of 1,3-butadiene and isoprene.

11. The method of claim 7, wherein said step of preparing a reactive polymer takes place in the presence of less than about 5% by weight of organic solvent based on the total weight of the monomer, organic solvent, and resulting polymer.

12. The method of claim 7, wherein said step of preparing a reactive polymer takes place in a temperature range of from about 0 ° C. to about 50 ° C.

13. The method of claim 7, wherein said lanthanide-based catalyst is formed by separately adding the lanthanide compound, the aluminoxane, the organoaluminum compound other than the aluminoxane, and the halogen-containing compound to the monomer.

14. The method of claim 7, wherein said lanthanide-based catalyst is formed by pre-mixing the lanthanide compound, the aluminoxane, the organoaluminum compound other than the aluminoxane, and the halogen-containing compound in the presence of about 1 to about 500 moles of conjugated diene monomer per mole of the lanthanide compound.

15. The method of claim 7, wherein said lanthanide-based catalyst is formed by first combining the lanthanide compound, the aluminoxane, and the organoaluminum compound other than the aluminoxane to form an initial composition, followed by combining the initial composition with the halogen-containing compound.

16. The method of claim 7, wherein the amount of the lanthanide compound is from about 0.001 to about 1 mmol per 100 gram of the conjugated diene monomer.

17. The method of claim 16, wherein the amount of the lanthanide compound is from about 0.005 to about 0.5 mmol per 100 gram of the conjugated diene monomer.

18. The method of claim 7, wherein the molar ratio of the aluminoxane to the lanthanide compound is from about 5:1 to about 1000:1.

19. The method of claim 7, wherein the molar ratio of the organoaluminum compound other than the aluminoxane to the lanthanide compound is from about 1:1 to about 200:1

20. The method of claim 7, where the functionalizing agent is a compound selected from the group consisting of ketones, quinones, aldehydes, amides, esters, isocyanates, isothiocyanates, epoxides, imines, aminoketones, aminothioketones, acid anhydrides, metal halides, metalloid halides, metal ester-carboxylate complexes, alkoxysilanes, alkoxystannanes, and mixtures thereof.

21. The method of claim 7, where the halogen-containing compound is an iodine-containing compound.

22. The method of claim 21, where the iodine-containing compound is selected from the group consisting of elemental iodine, iodine monochloride, iodine monobromide, iodine trichloride, iodine pentafluoride, iodine monofluoride, iodine triflouride, hydrogen iodide, iodomethane, diiodomethane, triiodomethane (also called iodoform), tetraiodomethane, 1-iodopropane, 2-iodopropane, 1,3-diiodopropane, t-butyl iodide, 2,2--dimethyl -1-iodopropane (also called neopentyl iodide), allyl iodide, iodobenzene, benzyl iodide, diphenylmethyl iodide, triphenylmethyl iodide, benzylidene iodide (also called benzal iodide), trimethylsilyl iodide, triethylsilyl iodide, triphenylsilyl iodide, dimethyldiiodosilane, diethyldiio do silane, diphenyldiio do silane, methyltriio do silane, ethyltriio do silane, phenyltriiodosilane, benzoyl iodide, propionyl iodide, methyl iodoformate, silicon tetraiodide, arsenic triiodide, tellurium tetraiodide, boron triiodide, phosphorus triiodide, phosphorus oxyiodide, selenium tetraiodide, aluminum triiodide, gallium triiodide, indium triiodide, titanium tetraiodide, zinc diiodide, germanium tetraiodide, tin tetraiodide, tin diiodide, antimony triiodide, magnesium diiodide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, and mixtures thereof.

23. A functionalized cis-1,4-polydiene produced by a method comprising the steps of:
(1) preparing a reactive polymer by polymerizing conjugated diene monomer with a lanthanide-based catalyst in the presence of less than about 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound; and
(2) contacting the reactive polymer with a functionalizing agent; wherein the resulting functionalized polymer has a cis-1,4-linkage content of greater than or equal to about 98%, a molecular weight distribution of less than 1.8, and a functionality of greater than or equal to about 80%, where the functionality is defined as the percentage of polymer chains comprising at least one functional group versus the total polymer chains in the polymer product.

24. The functionalized cis-1,4-polydiene of claim 23, wherein the conjugated diene monomer is 1,3-butadiene.

25. The functionalized cis-1,4-polydiene of claim 23, wherein the conjugated diene monomer is isoprene.

26. The functionalized cis-1,4-polydiene of claim 23, wherein the conjugated diene monomer is a mixture of 1,3-butadiene and isoprene.

27. A vulcanizable composition comprising the functionalized cis-1,4-polydiene of claim 23.

28. A tire prepared from the vulcanizable composition of claim 27.

29. A method for preparing a reactive cis-1,4-polydiene, the process comprising the step of polymerizing conjugated diene monomer with a lanthanide-based catalyst in the presence of less than about 20% by weight of organic solvent based on the total weight of monomer, organic solvent, and resulting polymer, where the lanthanide-based catalyst is the combination of or reaction product of (a) a lanthanide compound, (b) an aluminoxane, (c) an organoaluminum compound other than an aluminoxane, and (d) a halogen-containing compound, to thereby produce a polymer composition having a cis-1,4 content of greater than or equal to about 99%, a molecular weight distribution of less than 1.8, and greater than or equal to about 95% reactive ends.

30. The method of claim 29, where the halogen-containing compound is an iodine-containing compound.

31. The method of claim 30, where the iodine-containing compound is selected from the group consisting of elemental iodine, iodine monochloride, iodine monobromide, iodine trichloride, iodine pentafluoride, iodine monofluoride, iodine triflouride, hydrogen iodide, iodomethane, diiodomethane, triiodomethane (also called iodoform), tetraiodomethane, 1-iodopropane, 2-iodopropane, 1,3-diiodopropane, t-butyl iodide, 2,2-dimethyl -1-iodopropane (also called neopentyl iodide), allyl iodide, iodobenzene, benzyl iodide, diphenylmethyl iodide, triphenylmethyl iodide, benzylidene iodide (also called benzal iodide), trimethylsilyl iodide, triethylsilyl iodide, triphenylsilyl iodide, dimethyldiiodosilane, diethyldiio do silane, diphenyldiio do silane, methyltriio do silane, ethyltriio do silane, phenyltriiodosilane, benzoyl iodide, propionyl iodide, methyl iodoformate, silicon tetraiodide, arsenic triiodide, tellurium tetraiodide, boron triiodide, phosphorus triiodide, phosphorus oxyiodide, selenium tetraiodide, aluminum triiodide, gallium triiodide, indium triiodide, titanium tetraiodide, zinc diiodide, germanium tetraiodide, tin tetraiodide, tin diiodide, antimony triiodide, magnesium diiodide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, and mixtures thereof.

32. The functionalized cis-1,4-polydiene of claim 1, where the functionalized cis-1,4-polydiene has a cis-1,4-linkage content of greater than or equal to 99% and a functionality of greater than or equal to 95%.

33. The method of claim 7, where the resulting functionalized polymer has a cis-1,4-linkage content of greater than or equal to 99% and a functionality of greater than or equal to 95%.

34. The functionalized cis-1,4-polydiene of claim 23, where the resulting functionalized polymer has a cis-1,4-linkage content of greater than or equal to 99% and a functionality of greater than or equal to 95%.

35. The method of claim 29, where the polymer composition has a cis-1,4-linkage content of greater than or equal to 99% and greater than or equal to 95% reactive ends.

36. The functionalized cis-1,4-polydiene of claim 32, where the resulting functionalized polymer has a cis-1,4-linkage content of greater than or equal to 99.33% and a functionality of greater than or equal to 96.9%.

37. The method of claim 33, where the resulting functionalized polymer has a cis-1,4-linkage content of greater than or equal to 99.33% and a functionality of greater than or equal to 96.9%.

38. The functionalized cis-1,4-polydiene of claim 34, where the resulting functionalized polymer has a cis-1,4-linkage content of greater than or equal to 99.33% and a functionality of greater than or equal to 96.9%.

39. The method of claim 35, where the resulting functionalized polymer has a cis-1,4-linkage content of greater than or equal to 99.33% and reactive ends of greater than or equal to 96.9%.

* * * * *

UNITED STATES PATENT AND TRADEMARK OFFICE
CERTIFICATE OF CORRECTION

PATENT NO. : 8,017,695 B2
APPLICATION NO. : 11/964848
DATED : September 13, 2011
INVENTOR(S) : Luo et al.

It is certified that error appears in the above-identified patent and that said Letters Patent is hereby corrected as shown below:

Cover Page: Item 73

3. Assignee Name and Residence Data to be Printed on the Patent:
    (A) Name of Assignee:    (B) Residence:
    Bridgestone Corporation    Tokyo, Japan Signed and Sealed this
Twenty-second Day of May, 2012

David J. Kappos
*Director of the United States Patent and Trademark Office*